United States Patent [19]

Vos

[11] 3,986,726
[45] Oct. 19, 1976

[54] PIVOTABLE GOOSENECK TRAILER
[75] Inventor: Henry J. Vos, Jenison, Mich.
[73] Assignee: Dorsey Trailers, Inc., Elba, Ala.
[22] Filed: May 15, 1975
[21] Appl. No.: 577,669

[52] U.S. Cl. .......................................... 280/423 B
[51] Int. Cl.² ........................................ B62D 53/06
[58] Field of Search ........... 280/423 B, 425 A, 477, 280/478 R, 476 R

[56] References Cited
UNITED STATES PATENTS

| | | | |
|---|---|---|---|
| 2,851,181 | 9/1958 | Thomann | 280/425 A |
| 2,878,033 | 3/1959 | Polich | 280/423 B |
| 3,151,884 | 10/1964 | Felburn | 280/423 B |
| 3,622,181 | 11/1971 | Smith | 280/476 R |
| 3,679,233 | 7/1972 | Baker | 280/476 R |

FOREIGN PATENTS OR APPLICATIONS

| 1,206,732 | 12/1965 | Germany | 280/423 B |
|---|---|---|---|

Primary Examiner—M. H. Wood, Jr.
Assistant Examiner—John A. Pekar
Attorney, Agent, or Firm—Brumbaugh, Graves, Donohue & Raymond

[57] ABSTRACT

A gooseneck trailer having rear wheels and a deck for carrying a load includes a gooseneck supported at the front end of the deck for swinging movement between a towing position, abutting the deck front end, in which the gooseneck may be coupled to a tractor, and an open position, to facilitate front loading or unloading. In one embodiment a lever may be extended from the gooseneck to enable it to be swung manually between towing and open positions. In other embodiments the trailer includes a double acting cylinder and a control circuit for selectively applying pressurized fluid to the cylinder to swing the gooseneck between the two positions.

3 Claims, 7 Drawing Figures

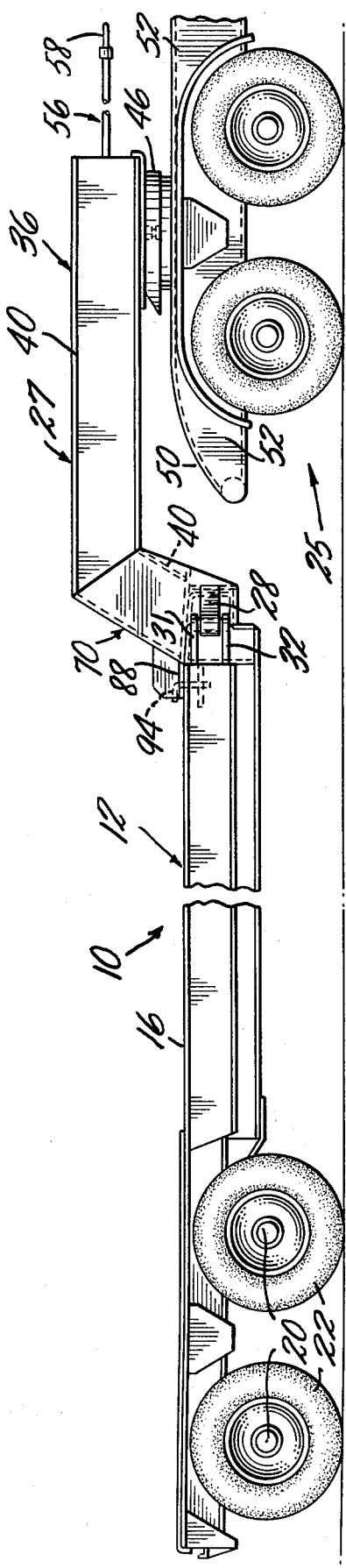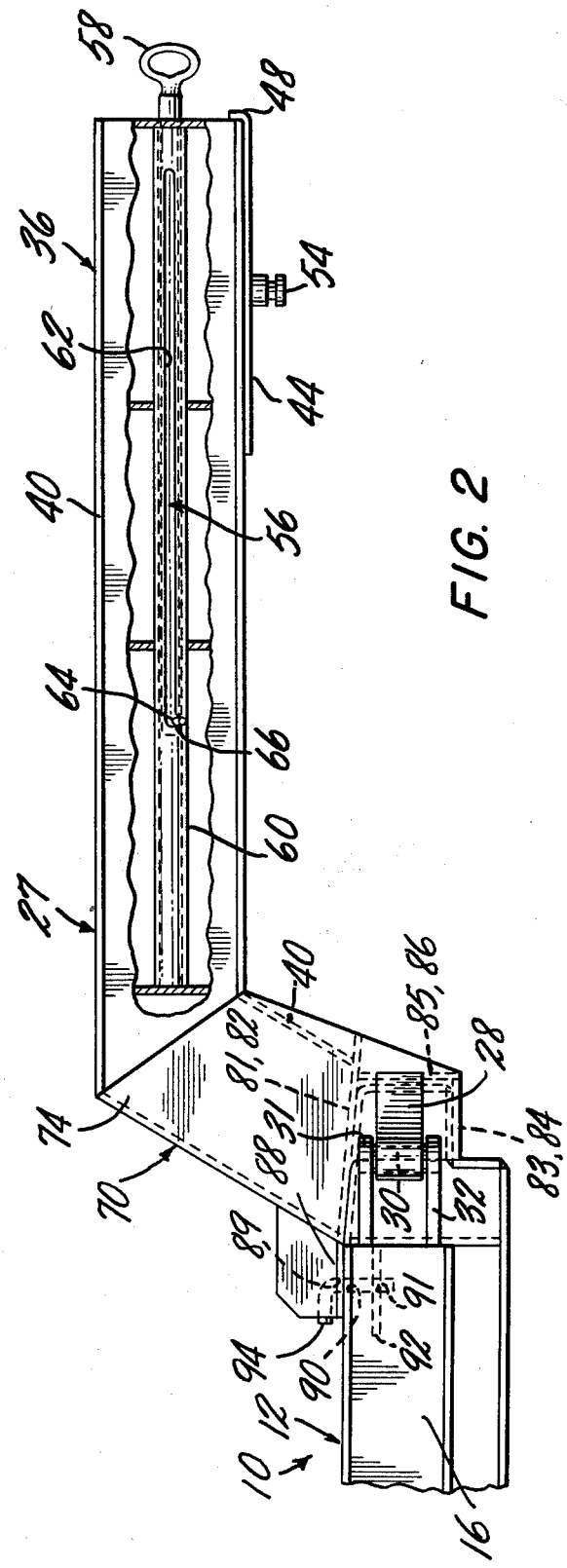

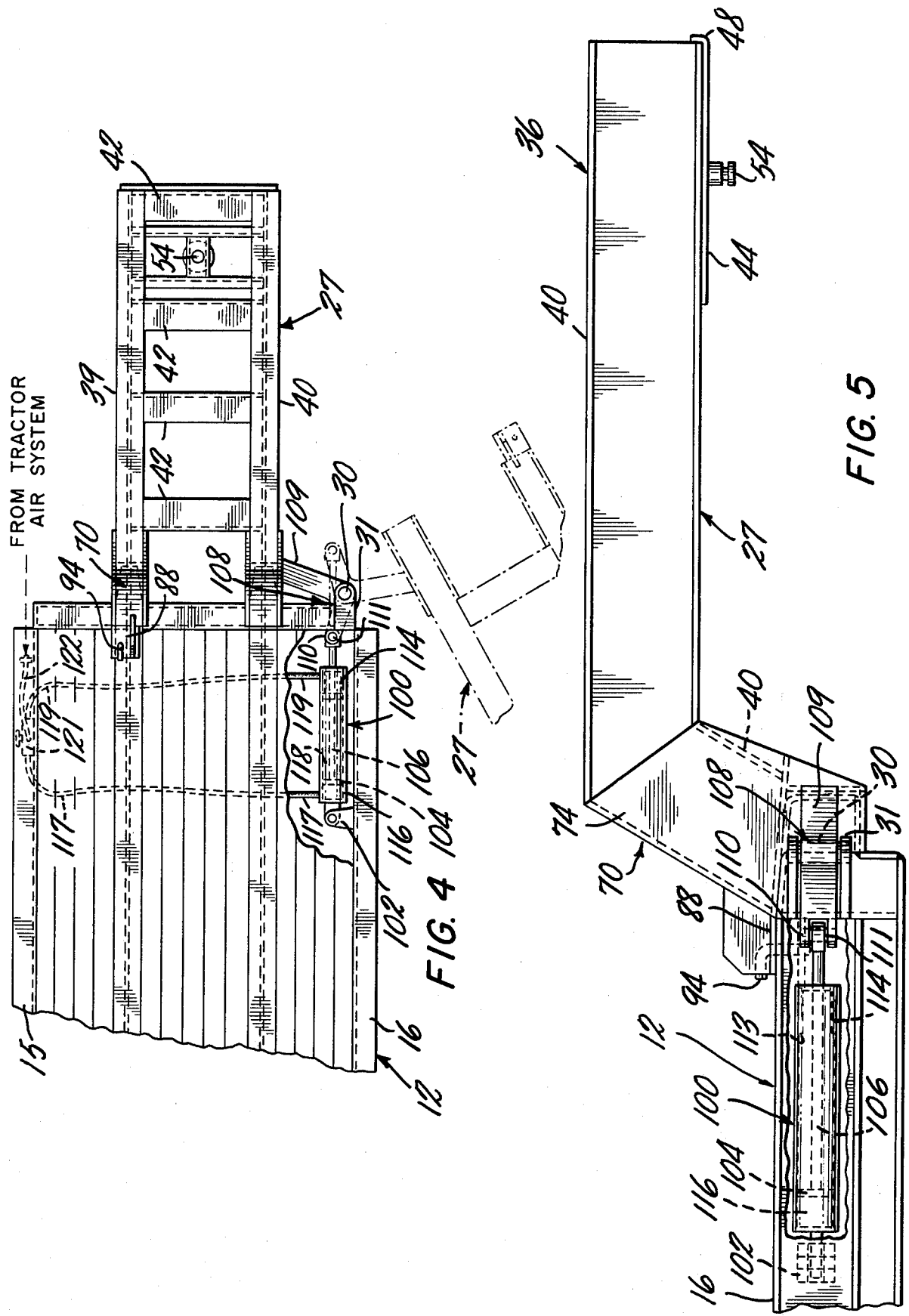

PIVOTABLE GOOSENECK TRAILER

BACKGROUND OF THE INVENTION

This invention relates to a gooseneck trailer adapted to be coupled to a tractor and particularly to a trailer in which the gooseneck is supported at the front end of the trailer for swinging movement between a closed towing position and an open loading position.

A low-bed trailer is used to haul very heavy loads such as road equipment and heavy machinery, the load deck height being as close to the ground as possible for ease in loading and to provide a low center of gravity for the loaded trailer. When larger diameter tires are required to carry very heavy loads, a trailer of the drop deck type is used in order to minimize the deck height.

Due to the difficulty and impracticality of trying to load very heavy loads over the rear or the side of a low-bed trailer, of either the level deck or drop deck type, low-bed trailers have been designed in which the gooseneck is removable. The gooseneck includes a hydraulic system or a winch by which the forward edge of the load deck is lowered to the ground, after which the gooseneck is disconnected from the load deck and moved completely away therefrom. The load can then be loaded over the forward portion of the load deck, which acts as a loading ramp. The hydraulic system on the gooseneck may include a gasoline engine and a driven hydraulic pump, or oil under pressure is obtained from the tractor. Alternatively, a winch mounted on the tractor lowers the trailer to the ground and removes the gooseneck.

In an effort to avoid the expense and maintenance required by special gasoline engines, winches, hydraulic pumps and cylinders, etc., a pivotably mounted gooseneck was proposed in the Polich U.S. Pat. No. 2,878,033. Here the gooseneck is pivotally connected to the front of the trailer deck at one side thereof, so that the gooseneck may swing away from the front of the deck for front loading or unloading. This proposal has never been commercialized, however, because it is impossible for one man to swing the gooseneck between the towing position and the open or loading position. This is because the gooseneck is the entire support for the front of the trailer, which may have a capacity of 60 tons, for example, and it is the gooseneck that connects the tractor to the trailer. Accordingly, the structural requirements for the gooseneck are such that it is too heavy for one person to swing.

In an effort to overcome this difficulty, the hinged gooseneck according to the Felburn U.S. Pat. No. 3,151,884 is split into two sections, which may be swung away toward opposite sides. When the trailer is to be towed, the two sections are bolted together. This version has not met with success, however, because the splitting of the gooseneck seriously compromises its strength.

These and other disadvantages of the prior art gooseneck trailers are overcome by the present invention.

SUMMARY OF THE INVENTION

In accordance with the invention, a gooseneck trailer is provided in which the gooseneck is supported at the front end of the load deck for swinging movement between a towing position, in which the gooseneck abuts the front end of the deck and may be coupled to a tractor, and an open position in which the deck front end is free for loading or unloading.

In one embodiment a lever may be extended from the gooseneck to enable it to be readily swung by one person between the towing and open positions. This provides a very simple, inexpensive and maintenance-free mechanism for manually swinging the gooseneck.

In another embodiment the trailer includes a double acting cylinder and a control circuit adapted to be connected to the pressurized air system of the tractor, whereby pressurized air may be selectively applied to the double acting cylinder to swing the gooseneck between the two positions, as desired.

In still another embodiment a double acting cylinder is included in a hydraulic system carried by the trailer deck that includes a reservoir for oil, a manual oil pump, and a control valve for selectively applying pressurized oil to the double acting cylinder so as to swing the gooseneck in the desired direction.

BRIEF DESCRIPTION OF THE DRAWINGS

The foregoing and additional advantages of the invention will be more readily apparent from the following description of exemplary embodiments, taken in conjunction with the figures of the accompanying drawings, in which:

FIG. 1 is a side elevational view of a gooseneck trailer in accordance with the invention;

FIG. 2 is an enlarged side elevational view of the gooseneck of the trailer of FIG. 1;

FIG. 4 is a plan view of another embodiment of the invention, employing a pneumatic system for swinging the gooseneck;

FIG. 5 is a side elevational view of the trailer of FIG. 4;

DESCRIPTION OF EXEMPLARY EMBODIMENTS

Figure 3:
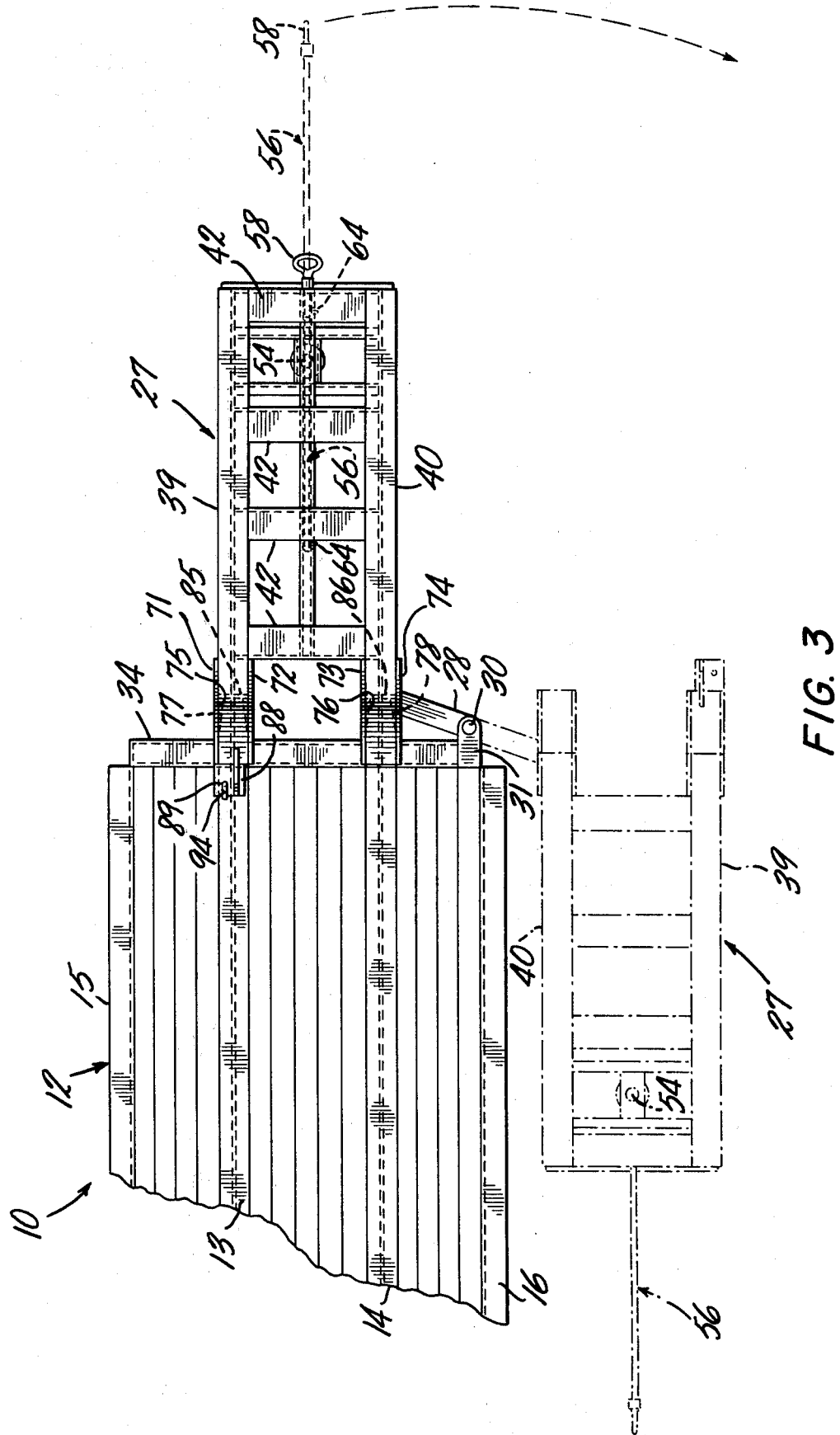
FIG. 3 is a plan view of the trailer of FIG. 1.

Referring to FIGS. 1–3, a gooseneck trailer 10 according to the invention includes a load carrying deck 12 having a pair of main longitudinal rails 13 and 14 and a pair of side rails 15 and 16.

The rear of the deck 12 is supported by a plurality of axles 20 carrying wheels 22, the main rails 13 and 14 being supported on the axles 20 by a suitable conventional suspension (not shown). The wheels 22 include conventional air brakes (not shown), hoses (not shown) being provided to connect the air brakes with the air system of a tractor 25 (shown in phantom) adapted to tow the trailer 10.

A gooseneck 27 is pivotally mounted at the front end of the deck 12 for swinging movement between the closed or towing position shown in full in FIG. 3 and the open or loading position shown in phantom. In particular, the gooseneck includes a lateral arm 28 which is pivotally mounted on a pin 30 carried by a pair of spaced arms 31 and 32, which are mounted on the side rail 16 and a front cross member 34 of the bed 12.

The gooseneck 27 includes a generally horizontal forward portion 36 having a pair of spaced rails 39 and 40 connected by a plurality of cross members 42. Mounted beneath the rails 39 and 40 is a horizontal plate 44 adapted to be supported by the conventional fifth wheel 46 of the tractor 25, the forward edge of the plate 44 being curved upwardly at 48 to provide a rounded surface adapted to slide up or down the conventional ramp surfaces 50 of the tractor frame 52, as the tractor moves back under or forwardly away from, respectively, the gooseneck 27. Preferably the surfaces 48 and 50 are greased to promote sliding therebetween. (For very heavy load capacity trailers, the nose 48 may be replaced by one or more rollers.) Extending below the plate 44 is a conventional kingpin 54 by means of which the trailer 10 is pivotally connected to the tractor 25, as is well known to those skilled in the art.

Telescopically mounted on the gooseneck portion 36 is lever 56 having a handle 58 at the exposed end thereof. The lever 56 is slidably received in a tubular housing 60, which is mounted beneath the cross members 42. The housing 60 has a longitudinal slot 62 in a lateral wall thereof, which receives a pin 64 extending laterally from the lever 56 adjacent the end remote from the handle 58.

At the end of the slot 62 remote from the kingpin 54 is a lateral locking slot 66 communicating with and extending downwardly from the slot 62. Accordingly, when the lever 56 is pushed into its retracted position shown in FIG. 2, the lever may be readily rotated by means of the handle 58 to drive the pin 64 down into the slot 66, thereby locking the lever in its retracted position and preventing it from sliding out of the housing 60 and possibly striking the tractor while the trailer 10 is being towed.

The end of the slot 62 generally above the kingpin 54 is located such that the pin 64 engages this end to limit the extent that the lever 56 can be extended from the gooseneck portion 36. When the lever is fully extended, a sufficient length of the lever remains within the housing 60 to insure a secure connection between the lever and the housing, so that the gooseneck 27 may be readily swung between the towing and open positions by application of manual force to the lever adjacent the handle 58.

The rails 39 and 40 extend generally downwardly from the rear of the forward gooseneck portion 36 to form a rear gooseneck portion 70, which includes a pair of side plates 71 and 72 welded on opposite sides of the rail 39, and a pair of side plates 73 and 74 welded on opposite sides of the rail 40. The plates 71–74 extend below the respective rails 39 and 40 to form a pair of pockets 75 and 76, which are adapted to receive the extended portions 77 and 78 of the main deck rails 13 and 14, respectively, when the gooseneck 27 is in the towing position shown in full in FIGS. 2 and 3.

The pockets 75 and 76 are defined by a pair of upper plates 81 and 82, lower plates 83 and 84, and end plates 85 and 86, respectively, the plates 81–86 being welded to the respective side plates 71–74. The lateral surfaces of the main rail extensions 77 and 78 incline inwardly (see FIG. 3) and the upper surfaces of the main rail extensions and the mating surfaces of the plates 81 and 82 incline downwardly (see FIG. 2) to facilitate the swinging of the gooseneck portion 70 into and out of abutting relation with the front end of the deck 12.

Extending from the rail 39 is a flange 88 adapted to overlie the main deck rail 13 when the gooseneck 27 is in the towing position. A hole 89 in the flange 88 is in registry with a hole 90 in the deck rail 13 and a hole 91 in a flange 92 welded to the web of the rail 13, the holes 89, 90 and 91 receiving a locking pin 94, when the gooseneck is in the towing position.

In order to load or unload the trailer 10, the gooseneck 27 is disconnected from the tractor fifth wheel 46 in the conventional manner, the trailer is held stationary by its own brakes or by choke blocks (not shown), and the tractor 25 is driven forward. The nose portion 48 of the gooseneck slides down the tractor frame ramp surfaces 50, lowering the deck 12 until the front end thereof rests upon the ground. (Alternatively, the front of the deck may rest upon one or more blocks.) The tractor is then driven away from the trailer.

The operator then removes the locking pin 94, grasps the lever handle 58, rotates the lever 56 to withdraw the pin 64 from the locking slot, and pulls the lever to its fully extended position shown in FIG. 3. The operator may then swing the gooseneck 27 to the open or loading position shown in phantom merely by pushing or pulling the lever 56 with one arm, grasping the lever adjacent the handle 58, due to the tremendous mechanical advantage provided by the lever. The deck 12 may then be loaded or unloaded over its front end.

When the trailer has been loaded or unloaded, the operator uses the extended lever 56 to swing the gooseneck back to its towing position, and the locking pin 64 is dropped into the holes 89–91. The tractor 25 is backed up to the gooseneck 27 so that the ramp surfaces 50 engage the gooseneck nose 48, and the tractor slides under the gooseneck, raising the trailer, until the kingpin 54 locks into the fifth wheel 46.

Figure 6:
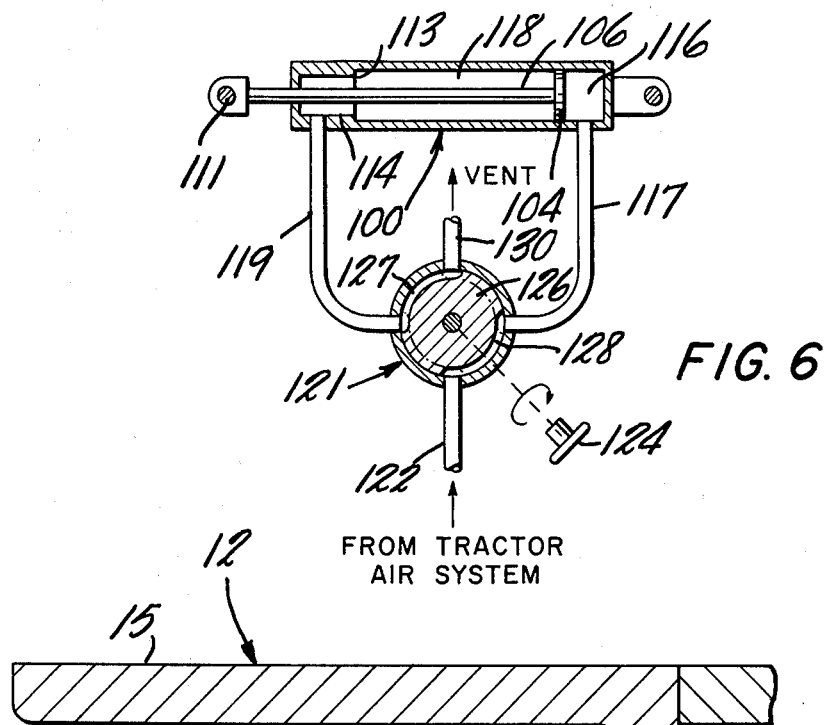
FIG. 6 is a schematic illustration of the control circuitry for the pneumatic system of the trailer of FIG. 4.

In the embodiment according to FIGS. 4–6, the trailer deck 12 carries a pneumatic system for swinging the gooseneck 27. A double acting cylinder 100 is pivotally mounted at one end to a bracket 102 welded to the inside of the side rail 16 and receives a piston 104 for reciprocation therein, the piston being coupled by a rod 106 to a bell crank 108. The bell crank includes an arm 109, which supports the gooseneck 27 for swinging movement about the pin 30. The other bell crank arm 110 is pivotally coupled at its end remote from the pin 30 to the piston rod 106 by means of a pin 111.

The gooseneck 27 is shown in full in FIG. 4 in the towing position, in which the pin 111 is slightly above the pin 30, and is shown in phantom in the loading position, in which the pin 111 is also slightly above the pin 30. The loading position is reached when the piston 104 engages an annular shoulder 113 formed by an enlarged portion 114 of the wall of the cylinder 100. Thus, the gooseneck rotates slightly less than 180° between the towing and loading positions, but in the loading position the front of the deck 12 is free for loading or unloading.

Air under pressure may be selectively applied to the cylinder chamber 116 to the left of the piston 104 through a conduit 117 to swing the gooseneck 27 to the loading position (after the locking pin 94 is removed), or may be applied to the chamber 118 to the right of the piston through a conduit 119 to swing the gooseneck to the towing position. Pressurized air is selectively applied to the conduits 117 and 119 through a control valve 121 from a conduit 122, which is adapted to be connected to the tractor air system used to power the air brakes, for example.

The control valve 121 is rotary, being manually adjusted by the handle 124. To interconnect the various conduits, a rotary valve member 126 has a pair of peripheral cavities 127 and 128, which in the positions shown in full in FIG. 6 interconnects the conduits 117 and 122, and the conduit 119 and a vent conduit 130.

This enables pressurized air to be applied to the cylinder chamber 116 and the air in the chamber 118 to be vented, to swing the gooseneck to the loading position. When the valve member 126 is rotated so that the cavities 127 and 128 are in the positions shown by dotted lines, pressurized air can be supplied through the conduits 122 and 119 to the cylinder chamber 118, and the chamber 116 can be vented through the conduits 117 and 130, to swing the gooseneck to the towing position.

If the valve member 126 is rotated so that the cavities 127 and 128 are in positions intermediate those shown in full and dotted lines in FIG. 6, the cylinder chambers 116 and 118 are isolated from the tractor air system and the vent conduit 130. Accordingly, after the gooseneck 27 has been swung to the loading position, the valve member 126 may be rotated to isolate the chambers 116 and 118 and thus keep the gooseneck in the loading position.

Figure 7:
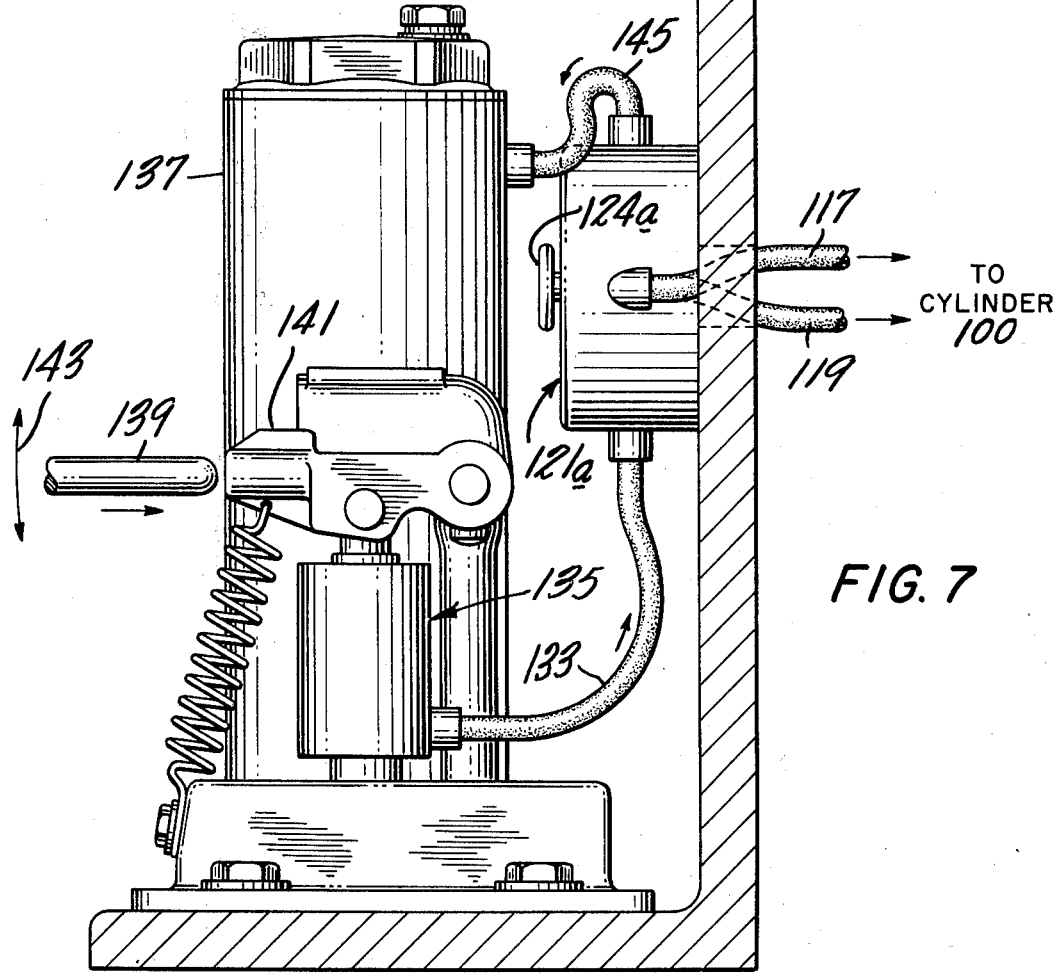
FIG. 7 is an elevational view of a reservoir, pump and control valve for a hydraulic system for the trailer of FIG. 4, according to still another embodiment of the invention.

In the embodiment according to FIG. 7, the trailer deck 12 carries a hydraulic system for swinging the gooseneck 27. Oil under pressure may be selectively applied to the double acting cylinder 100 through the conduits 117 and 119 by means of the control valve 121a, the operation of which is identical to that of the control valve 121 used in the pneumatic system of FIGS. 4–6.

Pressurized oil may be supplied to the control valve 121a through a conduit 133 (analogous to the conduit 122 of the pneumatic control system) from a conventional manually operable pump 135, which draws oil from a reservoir 137. When it is desired to operate the pump 135, a lever 139 is inserted into the mating portion of the reciprocable member 141 of the pump 135, and the lever 139 is reciprocated in the directions shown by the double headed arrow 143. While pressurized oil is pumped through the conduit 133, and the conduit 117 to the chamber 116 (for swinging the gooseneck to the loading position) or through the conduit 119 to the chamber 118 (for swinging the gooseneck to the towing position), oil is returned from the other chamber 118 or 116 through the other conduit 119 or 117, respectively, and through a return conduit 145 (analogous to the vent conduit 130 of the pneumatic control system) to the reservoir 137.

Although the invention has been described with reference to specific embodiments thereof, many modifications and variations may be made to one or all of those embodiments by one skilled in the art without departing from the inventive concepts disclosed. For example, the lever 56 could be pivotally mounted on the gooseneck 27 at its end remote from the handle 58 so as to swing approximately 180° between a retracted position and an extended position, one or more clips retaining the lever in one or both positions. Also, the lever could be removably received in a short tube mounted on the nose end of the gooseneck. All such variations and modifications, therefore, are intended to be included within the spirit and scope of the appended claims.

I claim:

1. In a gooseneck trailer having a deck for carrying a load and a plurality of wheels for supporting the rear end of the deck, the combination comprising:
   a. a gooseneck mounted on the front end of the deck including a generally horizontal forward portion having means for pivotally connecting the trailer to a tractor, and a rear portion extending generally downwardly and adapted to abut the front end of the deck,
   b. means pivotally supporting the gooseneck at the front end of the deck for swinging movement with respect thereto, and
   c. means for swinging the gooseneck between a first position in which the gooseneck abuts the front end of the deck and a second position in which the gooseneck is away from the front end of the deck so as to facilitate loading or unloading of the deck over the front end thereof, the swinging means including a lever mounted on the gooseneck so as to permit movement between an operative position in which it extends from the forward portion of the gooseneck so as to provide sufficient mechanical advantage to enable the gooseneck to be swung manually between the first and second positions and an inoperative position in which it is retracted in the gooseneck.

2. The combination according to claim 1 in which the lever is telescopically mounted in the forward portion of the gooseneck.

3. The combination according to claim 1 including means for releasably locking the lever in the inoperative position.

* * * * *